(12) United States Patent  
Li et al.

(10) Patent No.: US 7,190,837 B2  
(45) Date of Patent: Mar. 13, 2007

(54) COMPRESSION OF MIXED RASTER CONTENT (MRC) IMAGE DATA

(75) Inventors: Xing Li, Webster, NY (US); Ramesh Nagarajan, Pittsford, NY (US); Ammal Z. Malik, Webster, NY (US)

(73) Assignee: Xerox Corporation, Stamford, CT (US)

( * ) Notice: Subject to any disclaimer, the term of this patent is extended or adjusted under 35 U.S.C. 154(b) by 806 days.

(21) Appl. No.: 10/639,391

(22) Filed: Aug. 12, 2003

(65) Prior Publication Data

US 2005/0036694 A1    Feb. 17, 2005

(51) Int. Cl.  
G06K 9/36    (2006.01)  
G06K 9/34    (2006.01)

(52) U.S. Cl. .................. 382/232; 382/164; 382/173

(58) Field of Classification Search ............... 382/164, 382/173, 176, 232, 239, 162, 166, 167; 358/1.18, 358/1.2  
See application file for complete search history.

(56) References Cited

U.S. PATENT DOCUMENTS

| | | | | |
|---|---|---|---|---|
| 5,367,387 A | * | 11/1994 | Yamaguchi | 358/518 |
| 2002/0168105 A1 | * | 11/2002 | Li | 382/170 |
| 2004/0052419 A1 | * | 3/2004 | Curry et al. | 382/232 |

OTHER PUBLICATIONS

Donald J. Curry et al., entitled "Weak Edge Repositioning in a MRC Segmentor", U.S. Appl. No. 10/612,205, filed Jul. 1, 2003.

* cited by examiner

*Primary Examiner*—Duy M. Dang  
(74) *Attorney, Agent, or Firm*—R. Hutter

(57) ABSTRACT

In a mixed raster content (MRC) image data format, where a separation plane is used to define portions of the image to compressed in a lossy or lossless manner, edge pixels are identified in the separation plane. Each edge pixel is modified to assume a maximum luminance and most neutral chrominance found among neighboring pixels. The modification of the edge pixel data minimizes artifacts such as fringe effects when the image data is compressed and subsequently decompressed.

8 Claims, 3 Drawing Sheets

COMPRESSION OF MIXED RASTER CONTENT (MRC) IMAGE DATA

CROSS-REFERENCE TO RELATED APPLICATION

Cross reference is hereby made to the following co-pending U.S. patent application Ser. No. 10/612,250, filed Jul. 1, 2003, entitled WEAK EDGE REPOSITIONING IN A MRC SEGMENTOR, and assigned to the assignee hereof, U.S. Publication No. 2004/0052419 A1, published Mar. 18, 2004.

TECHNICAL FIELD

The present disclosure relates to a "mixed raster content" (MRC) technique for organizing and compressing image data, as would be useful in, for example, digital scanners, cameras or printers.

BACKGROUND

The "mixed raster content" (MRC) representation of documents provides the ability to represent color images and either color or monochrome text. In an MRC representation, an image is represented by more than one image plane. The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher spatial resolution than 1 bit per pixel) in one of the planes, called the Selector plane. Following a careful separation, the various planes could be independently compressed using standard compression schemes (such as JPEG and G4) with good compression and high quality at the same time.

FIG. 1 shows the general MRC representation. The representation typically comprises three independent planes: foreground, background, and a selector plane. (In some embodiments, other planes, such as including "rendering hints," are also provided.) The background plane is typically used for storing continuous-tone information such as pictures and/or smoothly varying background colors. The selector plane normally holds the image of text (binary) as well as other edge information (e.g., line art drawings). The foreground plane usually holds the color of the corresponding text and/or line art. However, the MRC representation only specifies the planes and their associated compression methods: it does not otherwise restrict nor enforce the content of each of the planes. The content of each of the planes may be defined appropriately by an implementation of the MRC representation.

The foreground and background planes are defined to be two full-color (L, a, b) or YCC planes. The Selector plane is defined as a binary (1-bit deep) plane. One exemplary MRC representation specifies that the foreground and background are to be JPEG compressed, or more generally, can be a suitable image for a lossy compression technique, and that the selector plane is to be ITU-G4 compressed, or more broadly is suitable for a lossless compression technique. In general, the foreground, background, and selector planes can all have different spatial resolutions, and they are not required to maintain the original source input resolution.

The method for assembling back a "segmented" MRC image from its components (i.e., planes) is by "pouring" the foreground colors through the selector plane "mask" on top of the background plane, thus overwriting the previous content of the background plane at these locations. In other words, the assembly is achieved by multiplexing between the foreground and background information on a pixel by pixel basis, based on the binary control signal of the selector plane. For example, if the selector value is 1 or ON, the content of foreground is used; otherwise (i.e., for selector value=0 of OFF) the content of background is used. The multiplexing operation is repeated on a pixel by pixel basis until all of the output pixels have been defined.

The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than one selector sample per source pixel) in the selector plane. Following a careful separation, the various planes could be independently compressed using standard compression schemes (such as JPEG and G4) with good compression and high quality at the same time.

The present disclosure relates to improving the quality of images which are rendered and compressed in MRC, especially in avoiding artifacts called "fringe effects," which result from imperfections in selecting a compression technique (lossy or lossless) near a boundary in the image between foreground and background portions.

SUMMARY

According to one aspect, there is provided a method of processing image data, comprising deriving from the image data a separation plane, the separation plane identifying a first subset of the image data and a second subset of the image data. An edge pixel is identified within the separation plane. An image datum corresponding to the identified edge pixel is altered.

DETAILED DESCRIPTION

Figure 1:
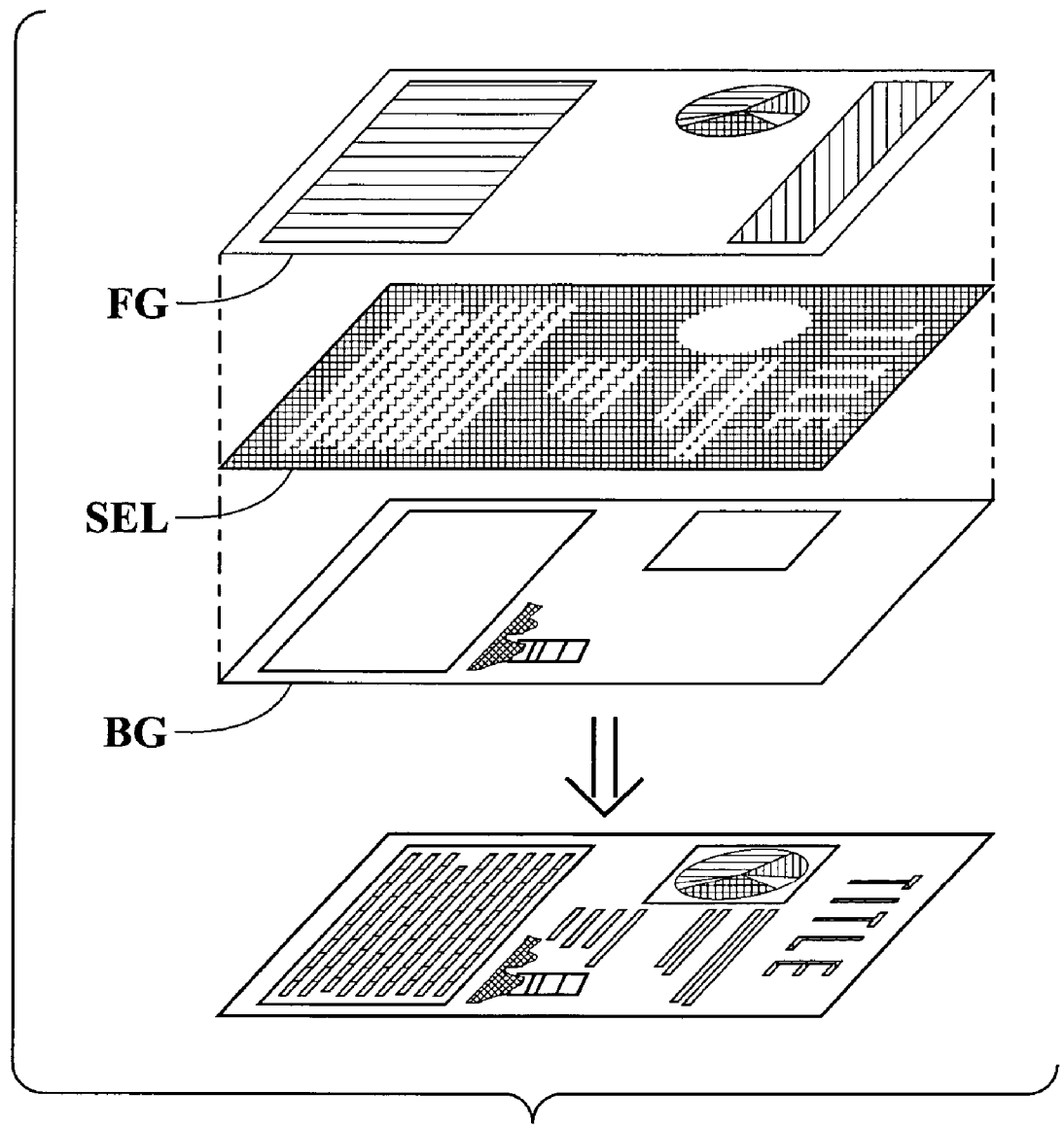
FIG. 1 is a diagram showing a principle of MRC image rendering, as known in the prior art.
Figure 2:
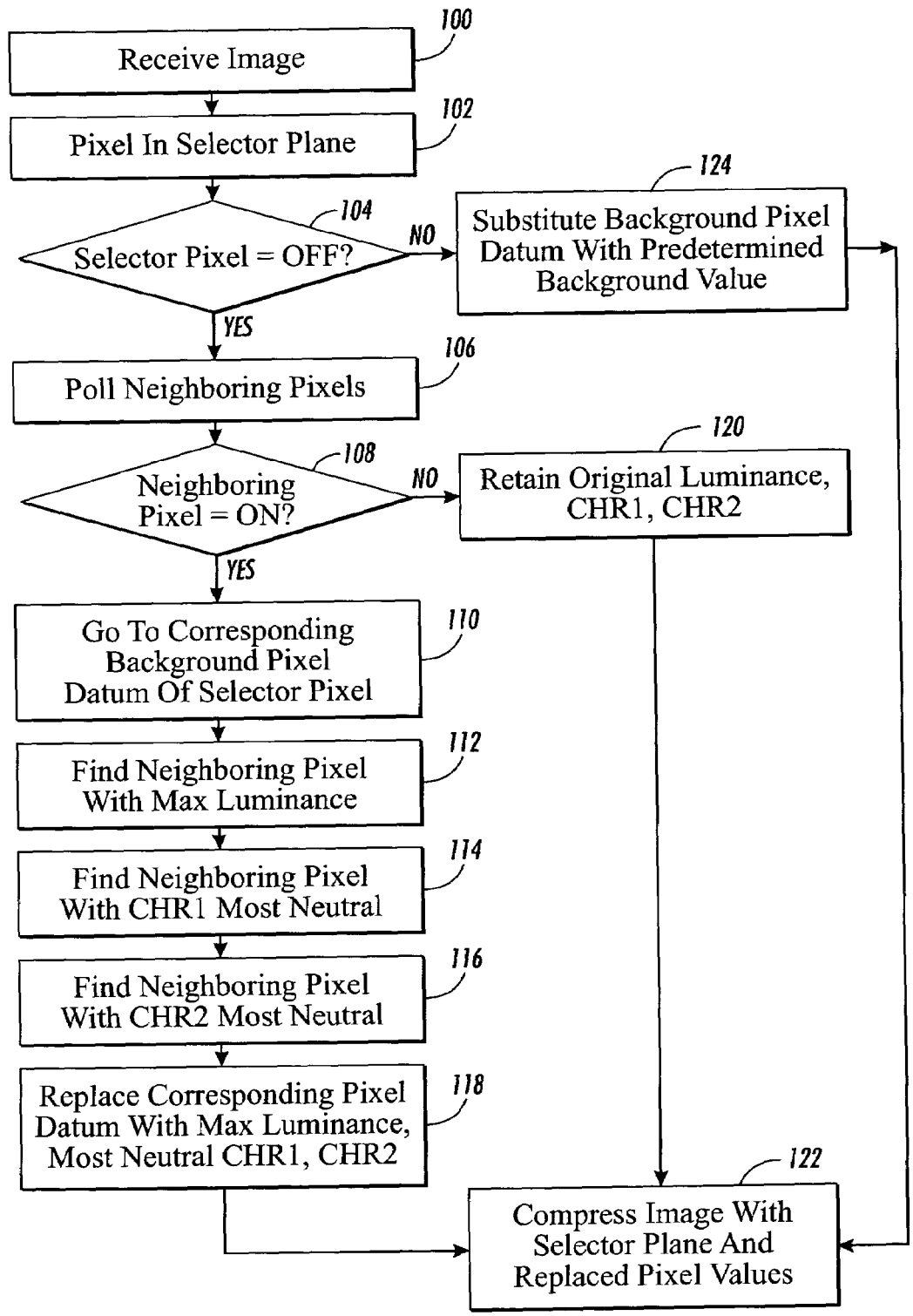
FIG. 2 is a flowchart illustrating a method of improving an MRC rendering of an image.

FIG. 2 is a flowchart illustrating a method of improving an MRC rendering of an image. The method isolates "edge data" or "edge pixels" within the separation plane of MRC data describing an image. These edge pixels, derived from an image (and typically including areas of an image around text, or along edges of photographs) are liable to cause misclassification of pixels near the boundaries as belonging to either the foreground or background portions of the image. When certain types of image data are misclassified, and then compressed in a non-optimal manner, the decompressed image may show artifacts such as "fringe effects" around the text shapes, or along the edges of photographs. Also, even with perfect classification one would obtain "fringe effects" due to the binary nature of background or foreground filling algorithms in MRC. A function of the below-described method is to slightly modify the background image data in MRC to minimize these characteristic fringe effects.

The method is carried out on every pixel datum in the selector plane of the image, after the selector plane is derived through a known separation technique. When a set of data, in an MRC representation scheme, is received (step 100) every pixel in every line of the selector plane is subjected to the following algorithm (step 102). First, it is determined whether the pixel of interest is OFF, (step 104) that is, whether the pixel in the selector plane is selecting the associated datum in the background plane. If the pixel of interest is OFF, the neighboring pixels of the image are polled (step 106) to see if any neighboring pixels are ON (step 108). As can be seen, the subsequent steps of the method are carried out only when the pixel of interest in the separation plane is itself OFF but a neighboring pixel is ON. As used herein, the term "neighboring pixel" shall refer typically to those 8 pixels abutting the pixel of interest in a 3×3 window; however, in different embodiments, "neighboring pixel" can be defined in other ways, with reference to image data of any kind of a predetermined spatial relationship to a pixel of interest.

If the pixel of interest in the separation plane is OFF but a neighboring pixel is ON, the pixel of interest is defined to be an "edge pixel," that is, a pixel close to a boundary between the foreground and background types of data in the complete MRC image. When the pixel is identified as an edge pixel, the method of the present embodiment alters certain values associated with the pixel in a manner which minimizes artifacts such as "fringe effects" which could appear when the image is compressed and subsequently decompressed. For a detected edge pixel, the corresponding image data in the background plane is consulted (step 110), as well as the background plane data for the neighboring pixels.

According to this embodiment, for a detected edge pixel, the background plane data for the pixel is altered, in effect, to "blend in" with its neighboring pixels, the effect of the "blending in" or "smoothing" being a lessening of subsequent fringe artifacts. According to the present method, the neighboring pixels are polled to find the neighboring pixel with maximum luminance (step 112), and the neighboring pixel or pixels with the most neutral chrominance in each of two channels (steps 114 and 116), meaning, in one practical embodiment, the chrominance in each scale which is closest to 128 on a 0 to 255 scale. Once the maximum luminance and most neutral chrominances in the neighboring pixels are found, the image data associated with the original detected edge pixel are thus altered to assume the maximum luminance and most neutral chrominances (step 118).

All of the pixels in the separation plane are processed in this way, and the background plane data associated with the edge pixels is altered accordingly. Of course, those pixels in the separation plane having no neighboring ON pixels in the separation plane (as determined at step 108) retain their original luminance and chrominance values (step 120). Following this processing of the entire image, the image with the original separation plane and the altered selected pixels in the background plane is compressed in a standard manner (step 122).

For those pixels in the selector plane which were not OFF, meaning those which were directing the compression to the background plane in the image data as originally, conventionally separated, the background pixels corresponding thereto can be substituted with a predetermined background value (step 124). The predetermined background value could be calculated based on a background histogram collected either from the lead-edge or the full-page image data of the input document. Alternatively for typical office documents, a background value of 255 (in a 8-bit system) could also be assumed.

Figure 3:
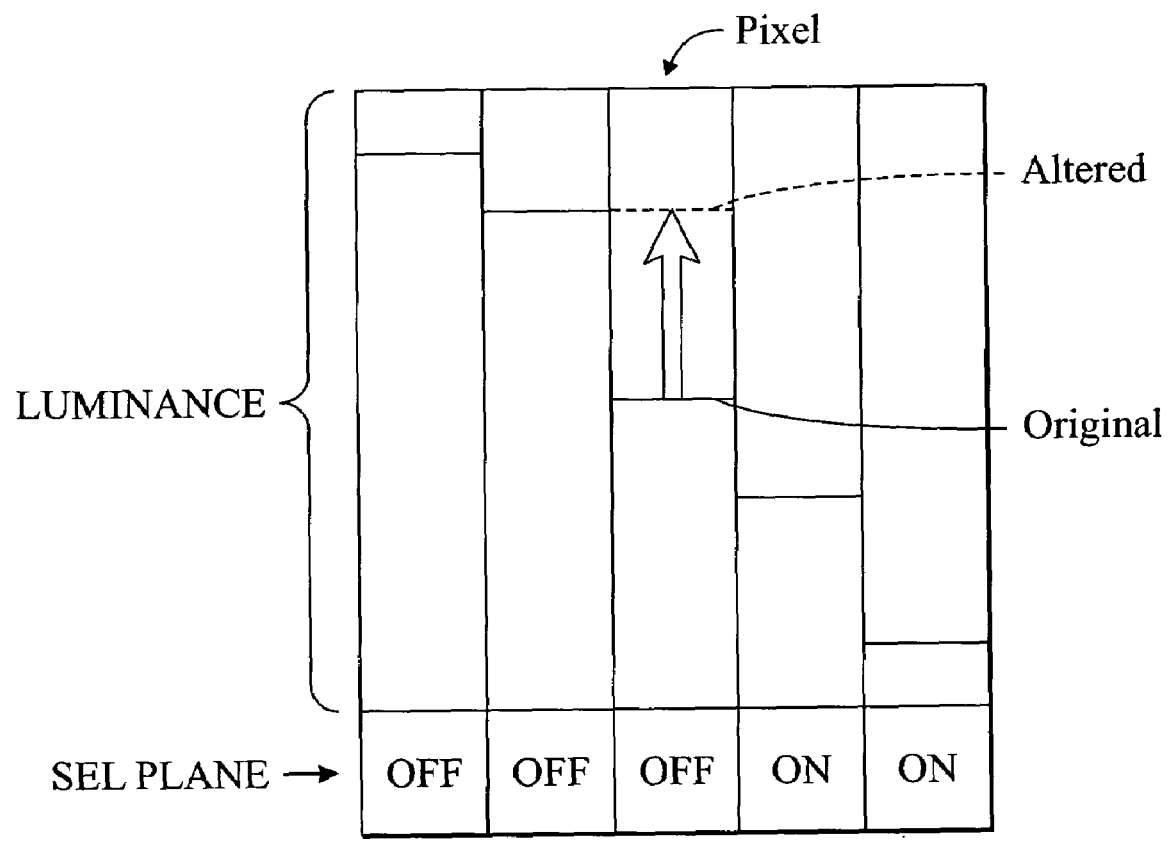
FIG. 3 is a diagram illustrating an operation of the method on a sample of pixels in an image.

FIG. 3 is a diagram illustrating an operation of the method on a sample of pixels in an image, in this case five sample pixels in a line within an image, here being shown only the luminance components of the background plane of the image data. Also shown are the statuses of the selector plane of the five pixels: as can be seen, three of the pixels in the separation plane are OFF while the next two are ON.

Taking the middle pixel of the five in FIG. 3 as the pixel of interest, it can be seen that the middle pixel PIXEL is identifiable as an edge pixel according to the method of FIG. 2 above: the separation plane value for the middle pixel is OFF, but at least one neighboring pixel, the fourth pixel, is ON in the separation plane. Looking now only at the luminance values, the original luminance value of middle pixel PIXEL is about in the middle of the luminance scale. However, according to the above-described method, the luminance of the PIXEL is altered to be that of the maximum luminance of the neighboring pixels, in this case the second pixel from the left has the maximum luminance value (the first pixel on the left is not a neighboring pixel if a 3×3 window of pixels is being used). Thus, according to the method, the middle pixel PIXEL is altered to assume the maximum luminance value among the neighboring pixels (regardless of whether the neighboring pixel with the maximum luminance value is an ON or OFF pixel in the selector plane). Similarly, although not shown here, the middle pixel PIXEL is altered to assume the "most neutral" chrominance in each channel of the chrominances of the neighboring pixels.

The invention claimed is:

1. A method of processing image data, comprising:
   deriving from the image data a separation plane, the separation plane identifying a first subset of the image data and a second subset of the image data;
   identifying an edge pixel within the separation plane; and
   altering an image datum corresponding to the identified edge pixel, the altering step including identifying a neighboring datum having a most neutral chrominance value of the neighboring pixels, and changing the luminance value of the edge pixel to a value related to the most neutral chrominance value of the neighboring pixels.

2. The method of claim 1, the edge pixel being related to a boundary between the first subset of the image data and the second subset of the image data.

3. The method of claim 1, the identifying step including identifying a pixel in the separation plane associated with the first subset of the data which is of a predetermined spatial relationship with a pixel associated with the second subset of the data.

4. The method of claim 1, the identifying step including identifying a pixel in the separation plane associated with the first subset of the data which abuts a pixel associated with the second subset of the data.

5. The method of claim 1, the altering step including changing at least one of a chrominance or luminance value of the image datum corresponding to the edge pixel.

6. The method of claim 1, the altering step including changing at least one of a chrominance or luminance value corresponding to the edge pixel, based on at least one of a chrominance or luminance value associated with at least one neighboring pixel.

7. The method of claim 1, the altering step including identifying a neighboring pixel having a maximum luminance value of the neighboring pixels, and changing the luminance value of the edge pixel to a value related to the maximum luminance value of the neighboring pixels.

8. The method of claim 1, further comprising compressing the image data according to the separation plane, following performing the altering step on all of the image data forming an image.

* * * * *